(12) United States Patent
Albrecht

(10) Patent No.: US 9,101,994 B2
(45) Date of Patent: Aug. 11, 2015

(54) SYSTEM AND DEVICE FOR WELDING TRAINING

(75) Inventor: Bruce Patrick Albrecht, Neenah, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 13/562,982

(22) Filed: Jul. 31, 2012

(65) Prior Publication Data

US 2013/0040270 A1     Feb. 14, 2013

Related U.S. Application Data

(60) Provisional application No. 61/521,843, filed on Aug. 10, 2011.

(51) Int. Cl.
| | |
|---|---|
| G09B 25/02 | (2006.01) |
| B23K 9/00 | (2006.01) |
| B23K 9/095 | (2006.01) |
| G09B 19/00 | (2006.01) |
| G09B 19/24 | (2006.01) |

(52) U.S. Cl.
CPC ................. B23K 9/00 (2013.01); B23K 9/0953 (2013.01); B23K 9/0956 (2013.01); G09B 19/003 (2013.01); G09B 19/24 (2013.01)
USPC ....... 434/234; 434/240; 434/219; 219/121.64

(58) Field of Classification Search
CPC ...................................................... G09B 25/02
USPC ....................... 434/219, 234, 240; 219/121.64
See application file for complete search history.

(56) References Cited

U.S. PATENT DOCUMENTS

| | | | |
|---|---|---|---|
| 1,340,270 | A | 5/1920 | Jahoda |
| 2,045,800 | A | 6/1936 | Walther |
| 2,045,801 | A | 6/1936 | Richter |
| 2,045,802 | A | 6/1936 | Walther |
| 2,333,192 | A | 11/1943 | Moberg |

(Continued)

FOREIGN PATENT DOCUMENTS

| | | |
|---|---|---|
| CA | 2311685 A1 | 12/2001 |
| CA | 2517874 A1 | 12/2001 |

(Continued)

OTHER PUBLICATIONS

U.S. Appl. No. 61/639,414.

(Continued)

*Primary Examiner* — Robert J Utama
(74) *Attorney, Agent, or Firm* — Fletcher Yoder P.C.

(57) ABSTRACT

A system and device for welding training. In one example, a welding training system includes a display configured to show welding features related to a training welding operation. The system also includes a training workpiece having a substantially transparent weld joint configured to be placed adjacent to the display during the training welding operation. The system includes a processing device coupled to the display and configured to provide welding data relating to the training welding operation to the display. The system also includes a training torch comprising an optical sensor. The training torch is coupled to the processing device and configured to provide the processing device with data from the optical sensor corresponding to a position of the training torch relative to the training workpiece.

18 Claims, 4 Drawing Sheets

(56) References Cited

U.S. PATENT DOCUMENTS

| | | |
|---|---|---|
| 2,351,910 A | 6/1944 | Blankenbuehler |
| 3,867,769 A | 2/1975 | Schow et al. |
| 4,028,522 A | 6/1977 | Chihoski et al. |
| 4,041,615 A | 8/1977 | Whitehill |
| 4,044,377 A | 8/1977 | Bowerman |
| 4,124,944 A | 11/1978 | Blair |
| 4,132,014 A | 1/1979 | Schow |
| 4,144,766 A | 3/1979 | Wehrmeister |
| 4,224,501 A | 9/1980 | Lindbom |
| 4,396,945 A | 8/1983 | DiMatteo et al. |
| 4,452,589 A | 6/1984 | Denison |
| 4,541,055 A | 9/1985 | Wolfe |
| 4,555,614 A | 11/1985 | Morris |
| 4,577,499 A | 3/1986 | Silke |
| 4,591,689 A | 5/1986 | Brown et al. |
| 4,594,497 A | 6/1986 | Takahashi |
| 4,595,368 A | 6/1986 | Cole |
| 4,595,820 A | 6/1986 | Richardson |
| 4,609,806 A | 9/1986 | Grabkowski et al. |
| 4,628,176 A | 12/1986 | Kojima et al. |
| 4,638,146 A | 1/1987 | Koyama |
| 4,680,014 A | 7/1987 | Paton et al. |
| 4,689,021 A | 8/1987 | Vasiliev et al. |
| 4,716,273 A | 12/1987 | Paton et al. |
| 4,721,947 A | 1/1988 | Brown |
| 4,728,768 A | 3/1988 | Cueman |
| 4,739,404 A | 4/1988 | Richardson |
| 4,867,685 A | 9/1989 | Brush et al. |
| 4,868,649 A | 9/1989 | Gaudin |
| 4,881,678 A | 11/1989 | Gaudin |
| 4,931,018 A * | 6/1990 | Herbst et al. .................. 434/234 |
| 4,937,427 A | 6/1990 | McVicker |
| 4,943,702 A | 7/1990 | Richardson |
| 4,954,690 A | 9/1990 | Kensrue |
| 4,996,409 A | 2/1991 | Paton et al. |
| 5,061,841 A | 10/1991 | Richardson |
| 5,185,561 A | 2/1993 | Good et al. |
| 5,211,564 A | 5/1993 | Martinez et al. |
| 5,283,418 A | 2/1994 | Bellows et al. |
| 5,304,774 A | 4/1994 | Durheim |
| 5,306,893 A | 4/1994 | Morris |
| 5,320,538 A | 6/1994 | Baum |
| 5,343,011 A | 8/1994 | Fujii et al. |
| 5,380,978 A * | 1/1995 | Pryor ....................... 219/121.64 |
| 5,397,872 A | 3/1995 | Baker et al. |
| 5,426,732 A | 6/1995 | Boies et al. |
| 5,464,957 A | 11/1995 | Kidwell et al. |
| 5,514,846 A | 5/1996 | Cecil et al. |
| 5,517,420 A | 5/1996 | Kinsman et al. |
| 5,521,843 A | 5/1996 | Hashima et al. |
| 5,571,431 A | 11/1996 | Lantieri |
| 5,617,335 A | 4/1997 | Hashima et al. |
| 5,659,479 A | 8/1997 | Duley et al. |
| 5,674,415 A | 10/1997 | Leong et al. |
| 5,675,229 A | 10/1997 | Thorne |
| 5,681,490 A | 10/1997 | Chang |
| 5,708,253 A | 1/1998 | Bloch et al. |
| 5,709,219 A | 1/1998 | Chen |
| 5,747,042 A | 5/1998 | Choquet |
| 5,823,785 A | 10/1998 | Matherne, Jr. |
| 5,832,139 A | 11/1998 | Batterman et al. |
| 5,856,844 A | 1/1999 | Batterman et al. |
| 5,930,093 A | 7/1999 | Morrissett |
| 5,999,909 A | 12/1999 | Rakshit et al. |
| 6,018,729 A | 1/2000 | Zacharia et al. |
| 6,039,494 A | 3/2000 | Pearce |
| 6,049,059 A | 4/2000 | Kim |
| 6,051,805 A | 4/2000 | Vaidya |
| 6,155,475 A | 12/2000 | Ekelof |
| 6,163,946 A | 12/2000 | Pryor |
| 6,226,395 B1 | 5/2001 | Gilliland |
| 6,236,017 B1 | 5/2001 | Smartt |
| 6,242,711 B1 | 6/2001 | Cooper |
| 6,271,500 B1 | 8/2001 | Hirayama |
| 6,290,740 B1 | 9/2001 | Schaefer |
| 6,301,763 B1 | 10/2001 | Pryor |
| 6,329,635 B1 | 12/2001 | Leong et al. |
| 6,337,458 B1 | 1/2002 | Lepeltier |
| 6,371,765 B1 | 4/2002 | Wall et al. |
| 6,441,342 B1 | 8/2002 | Hsu |
| 6,445,964 B1 | 9/2002 | White |
| 6,476,354 B1 | 11/2002 | Jank |
| 6,479,793 B1 | 11/2002 | Wittmann |
| 6,506,997 B2 | 1/2003 | Matsuyama |
| 6,516,300 B1 | 2/2003 | Rakshit et al. |
| 6,572,379 B1 | 6/2003 | Sears et al. |
| 6,583,386 B1 | 6/2003 | Ivkovich |
| 6,596,972 B1 | 7/2003 | Di Novo |
| 6,614,002 B2 | 9/2003 | Weber |
| 6,621,049 B2 | 9/2003 | Suzuki |
| 6,647,288 B2 | 11/2003 | Madill |
| 6,697,761 B2 | 2/2004 | Akatsuka et al. |
| 6,703,585 B2 | 3/2004 | Suzuki |
| 6,710,298 B2 | 3/2004 | Eriksson |
| 6,728,582 B1 | 4/2004 | Wallack |
| 6,734,393 B1 | 5/2004 | Friedl |
| 6,744,011 B1 | 6/2004 | Hu |
| 6,750,428 B2 | 6/2004 | Okamoto |
| 6,768,974 B1 | 7/2004 | Nanjundan et al. |
| 6,839,049 B1 | 1/2005 | Koizumi |
| 6,857,553 B1 | 2/2005 | Hartman |
| 6,868,726 B2 | 3/2005 | Lemkin |
| 6,927,360 B2 | 8/2005 | Artelsmair et al. |
| 6,937,329 B2 | 8/2005 | Esmiller |
| 6,977,357 B2 | 12/2005 | Hsu et al. |
| 6,995,536 B2 | 2/2006 | Challoner |
| 7,015,419 B2 | 3/2006 | Hackl |
| 7,045,742 B2 | 5/2006 | Feichtinger |
| 7,132,617 B2 | 11/2006 | Lee |
| 7,132,623 B2 | 11/2006 | De Miranda et al. |
| 7,150,047 B2 | 12/2006 | Fergason |
| 7,181,413 B2 | 2/2007 | Hadden et al. |
| 7,342,210 B2 | 3/2008 | Fergason |
| 7,358,458 B2 | 4/2008 | Daniel |
| 7,465,230 B2 | 12/2008 | LeMay |
| 7,474,760 B2 | 1/2009 | Hertzman et al. |
| 7,523,069 B1 | 4/2009 | Friedl |
| 7,564,005 B2 | 7/2009 | Cabanaw et al. |
| 7,574,172 B2 | 8/2009 | Clark et al. |
| D614,217 S | 4/2010 | Peters et al. |
| 7,698,094 B2 | 4/2010 | Aratani et al. |
| D615,573 S | 5/2010 | Peters et al. |
| 7,789,811 B2 | 9/2010 | Cooper |
| 7,826,984 B2 | 11/2010 | Sjostrand |
| 7,831,098 B2 | 11/2010 | Melikian |
| 7,839,416 B2 | 11/2010 | Ebensberger et al. |
| 7,845,560 B2 | 12/2010 | Emanuel et al. |
| D631,074 S | 1/2011 | Peters et al. |
| 7,899,618 B2 | 3/2011 | Ledet |
| 8,019,144 B2 | 9/2011 | Sugihara |
| 8,274,013 B2 | 9/2012 | Wallace |
| 2001/0032508 A1 | 10/2001 | Lemkin |
| 2002/0114653 A1 | 8/2002 | Gatta |
| 2002/0153354 A1 | 10/2002 | Norby et al. |
| 2003/0011673 A1 | 1/2003 | Eriksson |
| 2003/0172032 A1 | 9/2003 | Choquet |
| 2004/0069754 A1 | 4/2004 | Bates et al. |
| 2004/0251910 A1 | 12/2004 | Smith |
| 2005/0006363 A1 | 1/2005 | Hsu et al. |
| 2005/0017152 A1 | 1/2005 | Fergason |
| 2005/0127052 A1 | 6/2005 | Spencer |
| 2005/0133488 A1 | 6/2005 | Blankenship |
| 2005/0135682 A1 | 6/2005 | Abrams, Jr. et al. |
| 2005/0197115 A1 | 9/2005 | Clark et al. |
| 2005/0256611 A1 | 11/2005 | Pretlove |
| 2006/0010551 A1 | 1/2006 | Bishop |
| 2006/0136183 A1 | 6/2006 | Choquet |
| 2006/0163228 A1 | 7/2006 | Daniel |
| 2006/0173619 A1 | 8/2006 | Brant et al. |
| 2006/0241432 A1 | 10/2006 | Herline |
| 2007/0038400 A1 | 2/2007 | Lee |
| 2007/0114215 A1 | 5/2007 | Bill |
| 2007/0164006 A1 | 7/2007 | Burgstaller |
| 2007/0188606 A1 | 8/2007 | Atkinson et al. |

(56) References Cited

U.S. PATENT DOCUMENTS

| | | |
|---|---|---|
| 2007/0264620 A1 | 11/2007 | Maddix |
| 2007/0278196 A1 | 12/2007 | James et al. |
| 2008/0038702 A1 | 2/2008 | Choquet |
| 2008/0061113 A9 | 3/2008 | Seki |
| 2008/0124698 A1 | 5/2008 | Ebensberger |
| 2008/0149608 A1 | 6/2008 | Albrecht |
| 2008/0169277 A1 | 7/2008 | Achtner |
| 2008/0314887 A1 | 12/2008 | Stoger |
| 2009/0005728 A1 | 1/2009 | Weinert et al. |
| 2009/0057286 A1 | 3/2009 | Ihara et al. |
| 2009/0109128 A1 | 4/2009 | Nangle |
| 2009/0146359 A1 | 6/2009 | Canfield |
| 2009/0152251 A1 | 6/2009 | Dantinne |
| 2009/0161212 A1 | 6/2009 | Gough |
| 2009/0173726 A1 | 7/2009 | Davidson et al. |
| 2009/0200281 A1 | 8/2009 | Hampton |
| 2009/0200282 A1 | 8/2009 | Hampton |
| 2009/0230107 A1 | 9/2009 | Ertmer |
| 2009/0231423 A1 | 9/2009 | Becker et al. |
| 2009/0249606 A1 | 10/2009 | Diez et al. |
| 2009/0298024 A1* | 12/2009 | Batzler et al. ............ 434/234 |
| 2010/0048273 A1 | 2/2010 | Wallace et al. |
| 2010/0062405 A1 | 3/2010 | Zboray et al. |
| 2010/0062406 A1 | 3/2010 | Zboray et al. |
| 2010/0133247 A1 | 6/2010 | Mazumder |
| 2010/0201803 A1 | 8/2010 | Melikian |
| 2010/0207620 A1* | 8/2010 | Gies ......................... 324/240 |
| 2010/0224610 A1 | 9/2010 | Wallace |
| 2010/0283588 A1 | 11/2010 | Gomez |
| 2010/0291313 A1 | 11/2010 | Ling |
| 2011/0000892 A1 | 1/2011 | Mueller et al. |
| 2011/0006047 A1 | 1/2011 | Penrod et al. |
| 2011/0091846 A1 | 4/2011 | Kreindl et al. |
| 2011/0092828 A1 | 4/2011 | Spohn |
| 2011/0114615 A1 | 5/2011 | Daniel et al. |
| 2011/0117527 A1 | 5/2011 | Conrardy et al. |
| 2011/0183304 A1 | 7/2011 | Wallace et al. |
| 2011/0220619 A1 | 9/2011 | Mehn |
| 2011/0290765 A1 | 12/2011 | Albrecht et al. |
| 2011/0313731 A1 | 12/2011 | Vock |
| 2012/0072021 A1 | 3/2012 | Walser |
| 2012/0189993 A1 | 7/2012 | Kindig et al. |
| 2012/0231894 A1 | 9/2012 | Nicora |
| 2012/0248080 A1 | 10/2012 | Hutchison |
| 2012/0248083 A1 | 10/2012 | Garvey |
| 2012/0291172 A1 | 11/2012 | Wills |
| 2012/0298640 A1 | 11/2012 | Conrardy |
| 2013/0189656 A1* | 7/2013 | Zboray et al. ............ 434/219 |
| 2013/0189658 A1* | 7/2013 | Peters et al. ............. 434/234 |
| 2013/0200882 A1 | 8/2013 | Almalki |
| 2013/0209976 A1 | 8/2013 | Postlethwaite |
| 2014/0272836 A1 | 9/2014 | Becker |

FOREIGN PATENT DOCUMENTS

| | | |
|---|---|---|
| CA | 2549553 A1 | 7/2004 |
| CA | 2554498 A1 | 4/2006 |
| DE | 102010038902 | 2/2012 |
| EP | 0323277 A2 | 7/1989 |
| EP | 0878263 | 11/1998 |
| EP | 1029306 A1 | 8/2000 |
| EP | 01949147.1 | 6/2001 |
| EP | 03788729.6 | 12/2003 |
| EP | 05791580.3 | 9/2005 |
| GB | 2454232 A | 5/2009 |
| JP | H11146387 | 5/1999 |
| JP | 2000298427 | 10/2000 |
| JP | 2009125790 | 6/2009 |
| KR | 100876425 B1 | 12/2008 |
| SU | 1354234 A1 | 11/1987 |
| SU | 1489933 A1 | 6/1989 |
| SU | 1638145 | 3/1991 |
| SU | 1638145 A1 | 3/1991 |
| WO | 2004057554 A2 | 7/2004 |
| WO | 2005102230 A1 | 11/2005 |
| WO | 2005110658 A2 | 11/2005 |
| WO | 2006034571 A1 | 4/2006 |
| WO | 2009022443 | 2/2009 |
| WO | 2009053829 A2 | 4/2009 |
| WO | 2009060231 A1 | 5/2009 |
| WO | 2009092944 A1 | 7/2009 |
| WO | 2009146359 | 12/2009 |
| WO | 2010000003 A2 | 1/2010 |
| WO | 2010020867 A2 | 2/2010 |
| WO | 2010020870 A2 | 2/2010 |
| WO | 2012137060 | 10/2012 |

OTHER PUBLICATIONS

U.S. Appl. No. 61/724,321.
U.S. Appl. No. 61/724,322.
http://www.123arc.com Simulation and Certification.
123arc.com—"Weld into the future".
Image from Sim Welder.com—R-V's Welder Training Goes Virtual (undated).
Lincoln Electric VRTEX® Virtual Reality Arc Welding Trainer; http://www.lincolnelectric.com/en-us/equipment/training-equipment/pages/vrtex360.aspx.
Fronius International GmbH—Focus on welding—Fronius Virtual Welding; http://www.fronius.com/cps/rde/xchg/SID-99869147-0110E322/fronius_international/hs.xsl/79_15490_ENG_HTML.htm.
Porter, Nancy C., Edison Welding Institute; J. Allan Cote, General Dynamics Electric Boat; Timothy D. Gifford, VRSim; and Wim Lam, FCS Controls—Virtual Reality Welder Training—Session 5: Joining Technologies for Naval Applications.
Fast et al., Virtual Training for Welding, Proceedings of the Third IEEE and ACM International Symposium on Mixed and Augmented Reality (ISMAR 2004); 0-7695-2191-6/04.
Porter et al., EWI—CRP Summary Report SR0512, Jul. 2005—Virtual Reality Welder Training.
Porter, Nancy C., Edison Welding Institute; J. Allan Cote, General Dynamics Electric Boat; Timothy D. Gifford, VRSim; and Wim Lam, FCS Controls—Virtual Reality Welder Training—Project No. S1051 Navy Man Tech Program; Project Review for Ship Tech 2005,—Mar. 1, 2005, Biloxi, MS.
Fridenfalk et al., Design and Validation of a Universal 6D Seam Tracking System in Robotic Welding Based on Laser Scanning, Industrial Robotics: Programming, Simulation and Applicationl, ISBN 3-86611-286-6, pp. 702, ARS/pIV, Germany, Dec. 2006, edited by Kin Huat.
Virtual Reality Training Manual Module 1—Training Overview—A Guide for Gas Metal Arc Welding—EWI Copyright 2006.
thefabricator.com—Arc Welding Article; Heston, Tim, Virtual welding—Training in a virtual environment gives welding students a leg up—Mar. 11, 2008.
Jo et al., Visualization of Virtual Weld Beads, VRST 2009, Kyoto, Japan, Nov. 18-20, 2009; Electronics and Telecommunications Research Institute (ETRI) ACM 978-1 60558-869-8/09/0011.
Choquet, Claude, ARC+® & ARC PC Welding Simulators: Teach Welders with Virtual Interactive 3D Technologies; press release Jul. 2010.
Choquet, Claude, ARC+®: Today's Virtual Reality Solution for Welders (undated).
National Science Foundation—Where Discoveries Begin—Science and Engineering's Most Powerful Statements Are Not Made From Words Alone—Entry Details for NSF International Science & Engineering Visualization Challenge, Public Voting ended on Mar. 9, 2012; Velu the welder by Muralitharan Vengadasalam—Sep. 30, 2011; https://nsf-scivis.skild.com/skild2/NationalScienceFoundation/viewEntryDetaiLaction?pid . . .
GAWDA—Welding & Gases Today Online | GAWDA Media Blog; Will Games Turn Welding into a Virtual Market? Friday, Dec. 2, 2011; http://www.weldingandgasestoday.org/blogs/Devin-OToole/index.php/ta . . .
American Welding Society's Virtual Welding Trailer to Debut at FABTECH Careers in Welding Trailer Appeals to New Generation of Welders, Miami, Fla., Nov. 3, 2011.

(56) References Cited

OTHER PUBLICATIONS

NZ Manufacturer Game promotes welding trade careers; http://nzmanufacturer.co.nz/2011/11/game-promotes-welding-trade-careers/ . . . Competenz Industry Training; www.competenz.org.nz; Game promotes welding trade careers, Nov. 7, 2011.
Fronius Perfect Welding; 06,3082,EN v01 2010 aw05 ; Virtual Welding—The training method of the future.
IMPACT Spring 2012 vol. 12, No. 2, Undergraduate Research in Information Technology Engineering, University of Virginia School of Engineering & Applied Science.
TCS News&Events: Press Release: TCS wins the "People Choice" award from National Science Foundaton, USA, pp. 1-6; Press Release May 21, 2012; http://www.tsc.com/news_events/press_releases/Pages/TCS_People_Choice_award_Natio . . .
Quebec International, May 28, 2008 "Video Game" Technology to Fill Growing Need; http://www.mri.gouv.qc.ca/portail/_scripts/actualities/viewnew.asp?NewID=5516&strIdSit.
International Search Report from PCT application No. PCT/US2012/050059 dated Nov. 27, 2012, 16 pgs.
Aiteanu, Dorin, and Axel Graser, "Computer-Aided Manual Welding Using an Augmented Reality Supervisor," Sheet Metal Welding Conference XII, Livoinia, MI, May 9-12, 2006, pp. 1-14.
Ascension Technology Corporation: Tracking 3D Worlds: http://ascension-tech.com/, Dec. 1996.
Central Welding Supply http://www.welders-direct.com/ Feb. 29, 2000.
Cybernetics: Enhancing Human Performance found in the DTIC Review dated Mar. 2001, p. 186/19. See http://www.dtic.mil/dtic/tr/fulltext/u2/a385219.pdf.
Echtler, Florian, Fabian Stuurm, Kay Kindermann, Gudrun Klinker, Joachim Stilla, Jorn Trilk, Hesam Najafi, "The Intelligent Welding Gun: Augmented Reality for Experimental Vehicle Construction," Virtual and Augmented Reality Applications in Manufacturing, Ong S.K and Nee A.Y.C., eds., Springer Verlag, 2003, pp. 1-27.
Evaluating Two Novel Tactile Feedback Devices, by Thomas Hulin, Phillipp Kremer, Robert Scheibe, Simon Schaetzle and Carsten Preusche presented at the 4th International Conference on Enactive Interfaces, Grenoble, France, Nov. 19-22, 2007.
Fronius "The Ghost": http://www.fronius.com/cps/rde/xchg/SID-3202EAB7-AE082518/fronius_interational/hs.xs1/79_15490_ENG_HTML.htm; 2006.
ftp://www.hitl.washington.edu/pub/scivw/publications/IDS-pdf/HAPTIC1.PDF, (University of Washington): Table 11, Tactile Feedback Actuator Technologies, p. 119, below the table is a. Based on Hasser (1995, 1996).
Haptic Feedback for Virtual Reality by Grigore C. Burdea dated 1996.
Hemez, Francois M., Scott W. Doebling, "Uncertainty, Validation of Computer Models an the Myth of Numerical Predictability," Engineering Analysis Group (ESA-EA), Los Alamos National Laboratory, dated 2004.
Vicon: Motion Capture Systems: http://vicon.com/, Dec. 1998.
Himperich, Frederick, "Applications in Augmented Reality in the Automotive Industry," Fachgebiet Augmented Reality, Department of Informatics, Jul. 4, 2007, pp. 1-21.
Integrated Microelectromechanical Gyrosopes; Journal of Aerospace Engineering, Apr. 2003 pp. 65-75 (p. 65) by Huikai Xie and Garry K. Fedder.
Kiwinakiful; Holographic TV coming 2012 (as seen on BBC); http://www.youtube.com/watch?v=Ux6aD6vE9sk&feature=related, Jul. 2, 2011.
Kooima, Robert; Kinect +3D TV=Virtual Reality; http://www.youtube.com/watch?v=2MX1RinEXUM&feature=related, Feb. 26, 2011.
Natural Point, Trackir; http://www.naturalpoint.com/trackir/, Dec. 2003.
Numerical Simulation F Arc Welding Process and its Application Dissertation for Ohio State University by Min Hyun Cho, M.S. 2006: See Internet as this document is security protected) ohttps://etd.ohiolink.edu/ap:0:0:Application_Process=Download_ETD_SUB_DOC_ACCNUM:::F1501_ID:osu1155741113, attachment.
OptiTrack: Motion Capture Systems: http://www.naturalpoint.com/optitrack/, Mar. 2005.
PhaseSpace: Optical Motion Capture: http://phasespace.com/, 2009.
Playstation; Move Motion Controller: http://us.playstation.com/ps3/playstation-move/, Mar. 2010.
Polhemus: Innovation in Motion: http://polhemus.com/?page=researchandtechnology, 1992.
Ryu, Jonghyun, Jaehoon Jung, Seojoon Kim, and Seungmoon Choi, "Perceptually Transparent Vibration Rendering Using a Vibration Motor for Haptic Interaction," 16 IEEE International Conference on Robot & Human Interactive Communication, Jeju, Korea, Aug. 26-29, 2007.
Sandor, Christian, Gudrun Klinker, "PAARTI: Development of an Intelligent Welding Gun for BMW," PIA 2003, Tokyo, Japan, Technical University of Munich Department of Informatics, Oct. 7, 2003.
ShotOfFuel; Wii Head Tracking for 3D, http://www.youtube.com/watch?v=1x5ffF-0Wr4, Mar. 19, 2008.
The Rutgers Master II—New Design Force-Feedback Glove by Mourad Bouzit, Member, IEEE, Grigore Burdea, Senior Member, IEEE, George Popescu, Member, IEEE, and Rares Bolan, Student Member, found in IEEE/ASME Transactions on Mechatronics, vol. 7, No. 2, Jun. 2002.
Gundersen, O., et al. "The Use of an Integrated Multiple Neural Network Structure for Simultaneous Prediction of Weld Shape, Mechanical Properties, and Distortion in 6063-T6 and 6082-T6 Aluminum Assemblies." NIST Special Publication SP (2000): 255-300.
ArcSentry Weld Monitoring System, Version 3, Users Manual, Native American Technologies, Golden, CO, Dec. 10, 1999.
NAMeS, Native American Technologies Weld Measuring Software, Users Guide, 2000.
Native American Technologies, "Process Improvement Products" web page, http://web.archive.org/web/20020608050736/http://www.natech-inc.com/products.html, published Jun. 8, 2002.
Native American Technologies, "Official NAMeS Web Site" web page, http://web.archive.org/web/20020903210256/http://www.natech-inc.com/names/names.html, published Sep. 3, 2002.
Native American Technologies, "ArcSentry Weld Quality Monitoring System" web page, http://web.archive.org/web/20020608124903/http://www.natech-inc.com/arcsentry1/index.html, published Jun. 8, 2002.
Native American Technologies, "P/NA.3 Process Modelling and Optimization" web pages, http://web.archive.org/web/20020608125619/http://www.natech-inc.com/pna3/index.html, published Jun. 8, 2002.
Native American Technologies, "ArcDirector Weld Controller" web page, http://web.archive.org/web/20020608125127/http://www.natech-inc.com/arcdirector/index.html, published Jun. 8, 2002.
"Low Cost Virtual Reality Welding Training System," NSRP Joint Panel Meeting, Apr. 21, 2010, http://www.nsrp.org/6-Presentations/Joint/042110_Low_Cost_Virtual_Reality_Welder_Training_System_Fast.pdf.
"NJC Technology Displayed at ShipTech 2005", Welding Journal, vol. 84, No. 3, Mar. 2005, p. 54, https://app.aws.org/w/r/www/wj/2005/03/WJ_2005_03.pdf.
"Virtual Reality Program to Train Welders for Shipbuilding", American Welding Society, Navy Joining Center, https://app.aws.org/wj/2004/04/052/.
"Virtual Reality Welder Training Initiatives: Virtual Welding Lab Pilot," Paul D. Camp Community College, Advanced Science & Automation Corporation, Northrop Grumman Newport News, Nov. 22, 2006, http://www.nsrp.org/6-Presentations/WD/103106_Virtual_Reality_Welder.pdf.
"Virtual Welding: A Low Cost Virtual Reality Welder Training System," NSRP ASE, Feb. 19, 2009, http://www.nsrp.org/6-Presentations/WD/020409_Virtual_Welding_Wilbur.pdf.
"Vision for Welding Industry," American Welding Society, Apr. 22, 1999, http://www.aws.org/library/doclib/vision.pdf.
Bender Shipbuilding and Repair, Co., "Virtual Welding—A Low Cost Virtual Reality Welder Training System", Technical Proposal, Jan. 23, 2008.

(56) References Cited

OTHER PUBLICATIONS

Stone, R. T., K. Watts, and P. Zhong, "Virtual Reality Integrated Welder Training, Welding Research," Welding Journal, vol. 90, Jul. 2011, pp. 136-s-141-s, https://app.aws.org/wj/supplement/wj201107_s136.pdf.

Hillers, Bernd, Dorin Aiteanu, Axel Graser, "Augmented Reality—Helmet for the Manual Welding Process," Virtual and Augmented Reality Applications in Manufacturing, Institute of Automation, Universtity of Bremen, 2004.

* cited by examiner

SYSTEM AND DEVICE FOR WELDING TRAINING

CROSS REFERENCE TO RELATED APPLICATIONS

This application is a Non-Provisional Patent Application of U.S. Provisional Patent Application No. 61/521,843 entitled "Tracking Gun for Training," filed Aug. 10, 2011, which is herein incorporated by reference in its entirety.

BACKGROUND

The invention relates generally to welding and, more particularly, to a system and device for welding training.

Welding is a process that has increasingly become utilized in various industries and applications. Such processes may be automated in certain contexts, although a large number of applications continue to exist for manual welding operations. In both cases, such welding operations rely on a variety of types of equipment to ensure the supply of welding consumables (e.g., wire feed, shielding gas, etc.) is provided to the weld in appropriate amounts at the desired time.

In preparation for performing manual welding operations, welding operators may be trained using a welding training system. The welding training system may be designed to train welding operators with the proper techniques for performing various welding operations. Certain welding training systems may use virtual reality, augmented reality, or other training methods. As may be appreciated, these training systems may be expensive to acquire and operate. Accordingly, welding training institutions may only acquire a limited number of such training systems. Therefore, welding operators being trained by the welding training institutions may have a limited amount of time for hands-on training using the training systems.

BRIEF DESCRIPTION

In one embodiment, a welding training system includes a display configured to show welding features related to a training welding operation. The system also includes a training workpiece having a substantially transparent weld joint configured to be placed adjacent to the display during the training welding operation. The system includes a processing device coupled to the display and configured to provide welding data relating to the training welding operation to the display. The system also includes a training torch comprising an optical sensor. The training torch is coupled to the processing device and configured to provide the processing device with data from the optical sensor corresponding to a position of the training torch relative to the training workpiece.

In another embodiment, a welding training system includes a training workpiece having a substantially transparent weld joint configured to be placed adjacent to a display during a training welding operation such that a portion of the display is visible by looking through the substantially transparent weld joint. The system also includes a training torch having a sensor configured to detect data corresponding to a position of the training torch relative to the training workpiece during the training welding operation.

In another embodiment, a welding training system includes a processing device coupled to a display and configured to provide welding data relating to a training welding operation to the display. The system also includes a training torch having an optical sensor. The training torch is coupled to the processing device and configured to provide the processing device with data from the optical sensor corresponding to a position of the training torch relative to a training workpiece.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
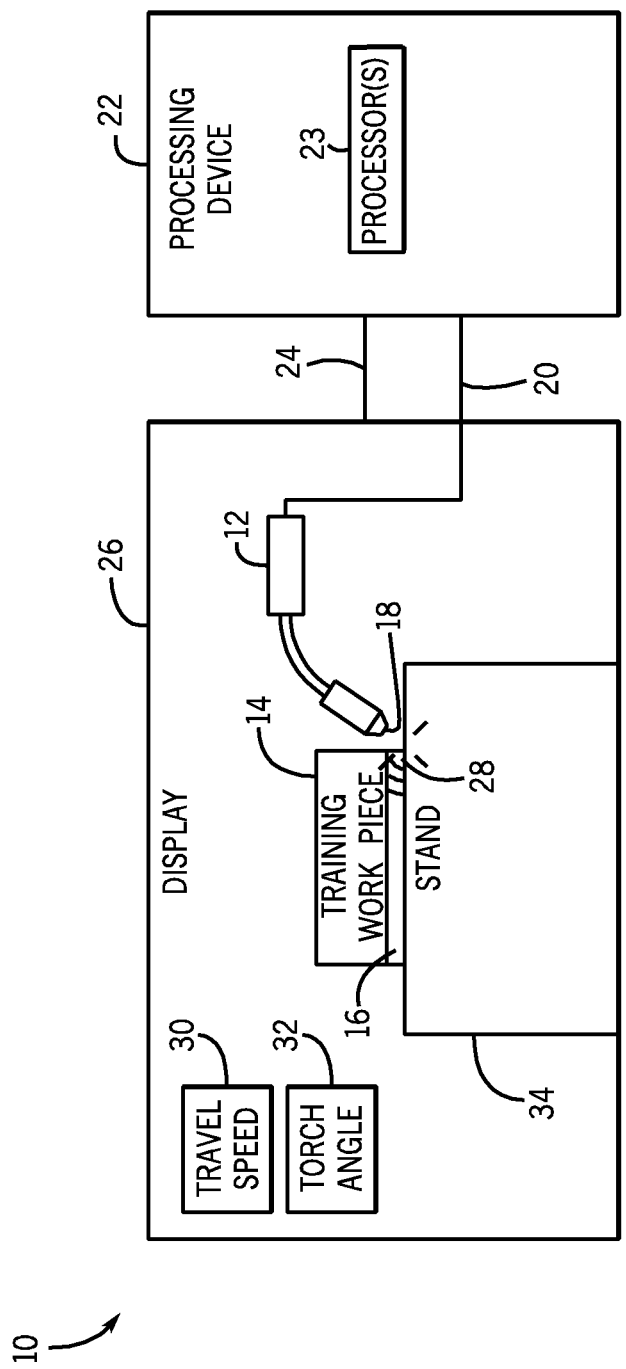
FIG. 1 is a block diagram of an embodiment of a welding training system in accordance with aspects of the present disclosure.

FIG. 1 is a block diagram of an embodiment of a welding training system 10. The welding training system 10 includes a training torch 12 that may be used for training a welding operator in various welding techniques. The welding training system 10 also includes a training workpiece 14 having a substantially transparent weld joint 16. The weld joint 16 may simulate a weld joint formed during a welding operation (e.g., fillet, lap, butt, groove, etc.). The training torch 12 includes an optical sensor 18 (e.g., camera) that may be used to detect image data (e.g., from the training workpiece 14). In certain embodiments, the detected image data may correspond to a location of the training torch 12 relative to the training workpiece 14. For example, a welding operator may direct the training torch 12 toward the weld joint 16 of the training workpiece 14. The optical sensor 18 of the training torch 12 may then detect image data from the weld joint 16 that may be used to determine a position of the training torch 12 relative to the training workpiece 14.

A first wired interface 20 electrically couples the training torch 12 to a processing device 22 having one or more processor(s) 23. After the training torch 12 detects image data, the training torch 12 provides the image data (e.g., data corresponding to the training workpiece 14, data corresponding to a position of the training torch 12 relative to the training workpiece 14) to the processing device 22 for processing. The processing device 22 may use the image data to determine a position of the training torch 12 relative to the training workpiece 14. A second wired interface 24 electrically couples the processing device 22 to a display 26. Accordingly, the processing device 22 may provide welding data to the display 26 for showing images of welding features that correspond to a welding training operation being performed by a welding operator. For example, the display 26 may show a virtual weld bead 28 corresponding to the welding training operation.

As illustrated, the virtual weld bead 28 may be shown on the display 26 behind the weld joint 16 of the training workpiece 14. As may be appreciated, the processing device 22 may use the determined position of the training torch 12 relative to the training workpiece 14, and a corresponding position of the training workpiece 14 relative to the display 26 to determine where to show the virtual weld bead 28. In certain embodiments, the processing device 22 may be configured to account for a refresh rate of the display 26 and/or lighting conditions (e.g., glare) while processing image data detected by the training torch 12. The display 26 may show other parameters relating to the training welding operation in addition to the virtual weld bead 28. For example, the display 26 may show a travel speed 30 and/or a torch angle 32 (e.g., travel angle, work angle, torch orientation, etc.). As illustrated, the training workpiece 14 is placed adjacent to the display 26 (e.g., touching the display, within ⅛ inch of the display, etc.) during a training welding operation.

A stand 34 may be configured for and used to support the training workpiece 14. As may be appreciated, in certain embodiments, the stand 34 may also be used to calibrate the location of the training workpiece 14 relative to the display 26 (e.g., by the stand 34 and the display 26 being placed in a predetermined location in relation to each other). In other embodiments, the location of the training workpiece 14 relative to the display 26 may be manually calibrated (e.g., before a training welding operation is performed). For example, the welding operator may be instructed to touch an end of the training torch 12 to one or more predetermined locations on the training workpiece 14, which may allow the processing device 22 to determine a location of the training workpiece 14 relative to the display 26. During such a calibration, the display 26 may show a configuration pattern to enable the optical sensor 18 of the training torch 12 to detect image data corresponding to a position on the display 26. Using the training torch 12 with the optical sensor 18, the welding training system 10 enables a welding operator to be trained with a minimal amount of specialized training devices. Accordingly, by using the welding training system 10 a welding operator may receive welding training at a lower cost than possible with other welding training systems.

Figure 2:
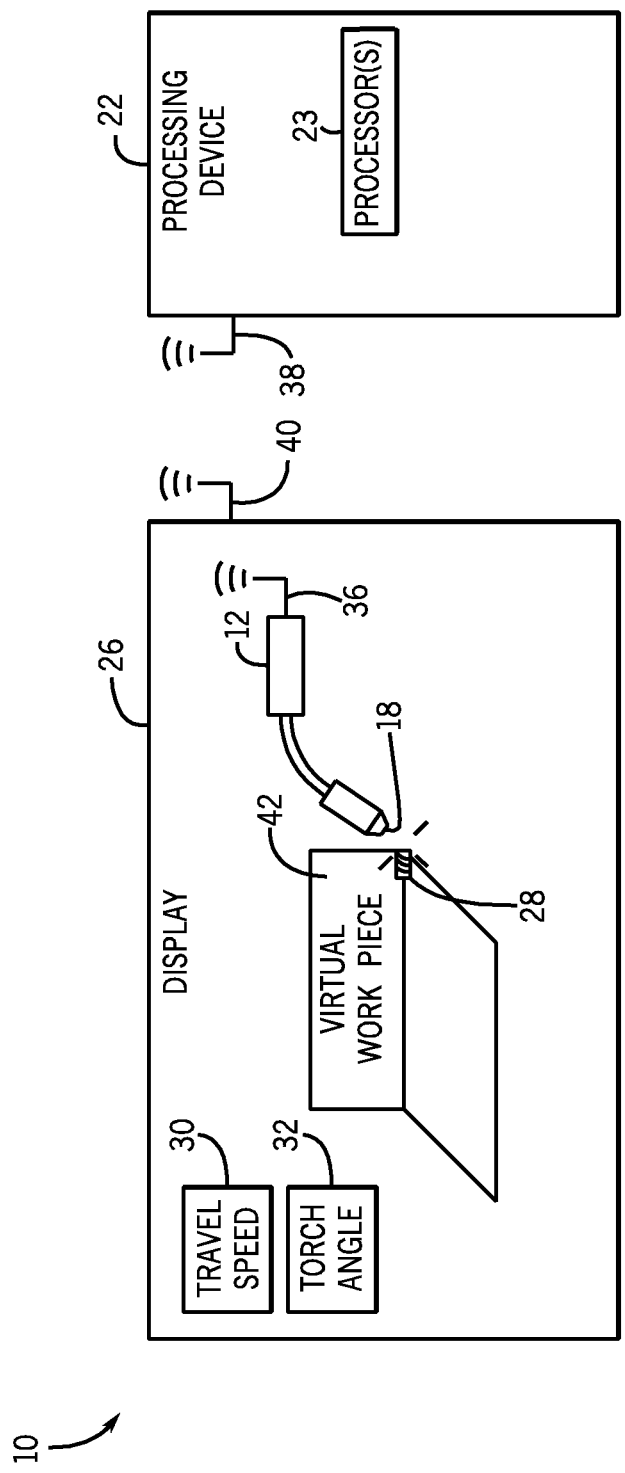
FIG. 2 is block diagram of another embodiment of a welding training system in accordance with aspects of the present disclosure.

FIG. 2 is block diagram of another embodiment of the welding training system 10. In this embodiment, the training torch 12, the processing device 22, and the display 26 communicate via wireless interfaces 36, 38, and 40. As may be appreciated, in certain embodiments, the welding training system 10 may communicate via a combination of wired and wireless interfaces. Furthermore, in some embodiments, the training torch 12 may provide data to the processing device 22 using a universal serial bus (USB) interface. As illustrated, a virtual workpiece 42 may be used in place of the training workpiece 14. Accordingly, the optical sensor 18 of the training torch 12 may detect image data directly from the display 26. In certain embodiments, the image data may correspond to a location of the training torch 12 relative to the virtual workpiece 42 and/or the display 26. Using the virtual workpiece 42, a welding operator may perform virtual welds on the display 26 by placing the optical sensor 18 of the training torch 12 near the virtual workpiece 42. In certain embodiments, the display 26 may be configured for three-dimensional viewing. In such an embodiment, the welding operator may wear three-dimensional glasses while performing welding training operations. It should be noted that the wireless interfaces 36, 38, and 40 and/or the virtual workpiece 42 may enable welding training to be performed with less interference from cables and other training devices.

Figure 3:
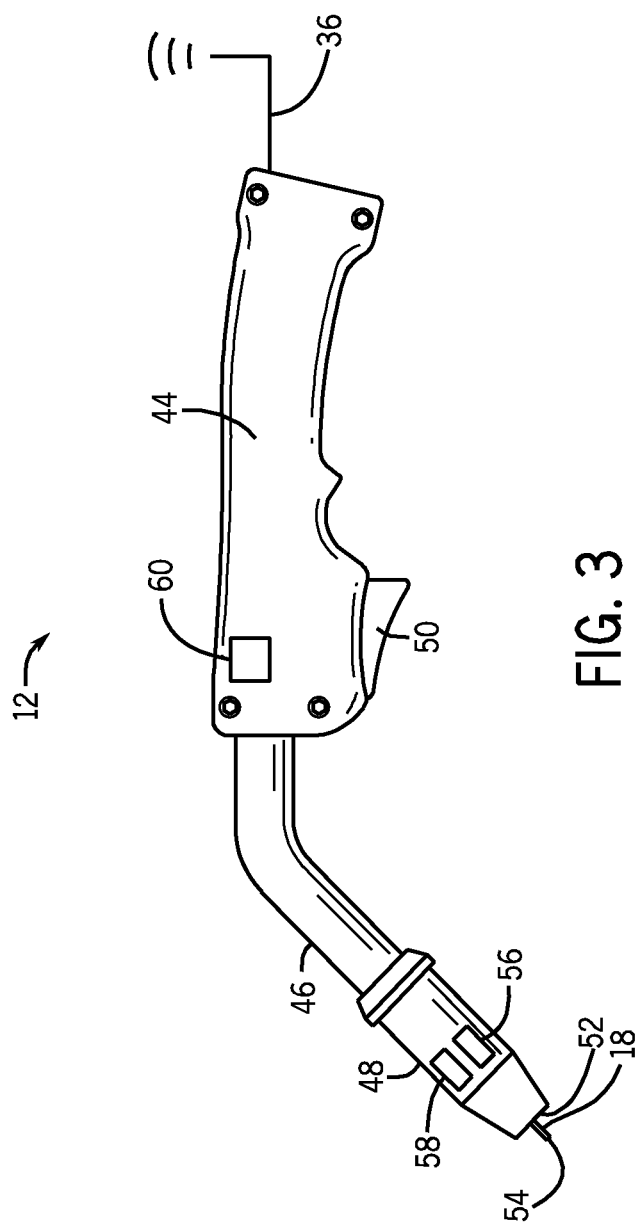
FIG. 3 is a side view of an embodiment of a training torch in accordance with aspects of the present disclosure.

FIG. 3 is a side view of an embodiment of a training torch 12 configured to be used in the welding training system 10 of FIG. 1. As previously discussed, the training torch 12 is configured to detect image data using the optical sensor 18. In the present embodiment, the training torch 12 includes a handle 44, a neck 46, and a nozzle 48. Furthermore, the handle 44 includes a trigger 50 for initiating a training welding operation. As illustrated, the handle 44 is coupled to the nozzle 48 via the neck 46. The optical sensor 18 may extend out of a tip 52 of the nozzle 48. Moreover, the optical sensor 18 may include one or more lenses 54 (e.g., adjustable lenses) to change the focal point of the optical sensor 18 (e.g., to obtain clear and focused image data). In certain embodiments, the optical sensor 18 may be configured to alter the focus of the one or more lenses 54 based on a distance between the optical sensor 18 and the training workpiece 14, and/or a distance between the optical sensor 18 and the virtual workpiece 42. Furthermore, the one or more lenses 54 may include a multi-surface lens (e.g., diamond shaped).

The training torch 12 also includes an optical emitter 56 configured to produce emissions. In certain embodiments, the emissions from the optical emitter 56 may reflect off of the training workpiece 14 and/or the virtual workpiece 42. As may be appreciated, the reflected emissions may be detected by the optical sensor 18 of the training torch 12. Moreover, in the illustrated embodiment, the training torch 12 includes a magnetic sensor 58, while in other embodiments, the training torch 12 may not include the magnetic sensor 58. The magnetic sensor 58 may be used in a welding training system 10 having corresponding magnetic devices to be detected by the magnetic sensor 58 (e.g., for determining the position of the training torch 12. For example, in certain embodiments, the training workpiece 14 may produce a magnetic field and the magnetic sensor 58 may be configured to detect the magnetic field of the training workpiece 14. Furthermore, the training torch 12 may include an orientation sensor 60 (e.g., gyroscope) to detect orientation data of the training torch 12 and to provide the orientation data to the processing device 22. It should be noted that in certain embodiments, the training torch 12 may include an electromagnetic sensor, a radio frequency (RF) sensor, and/or any other suitable sensor to aid in determining a position and/or an orientation of the training torch 12 relative to a workpiece (e.g., the training workpiece 14, the virtual workpiece 42).

Figure 4:
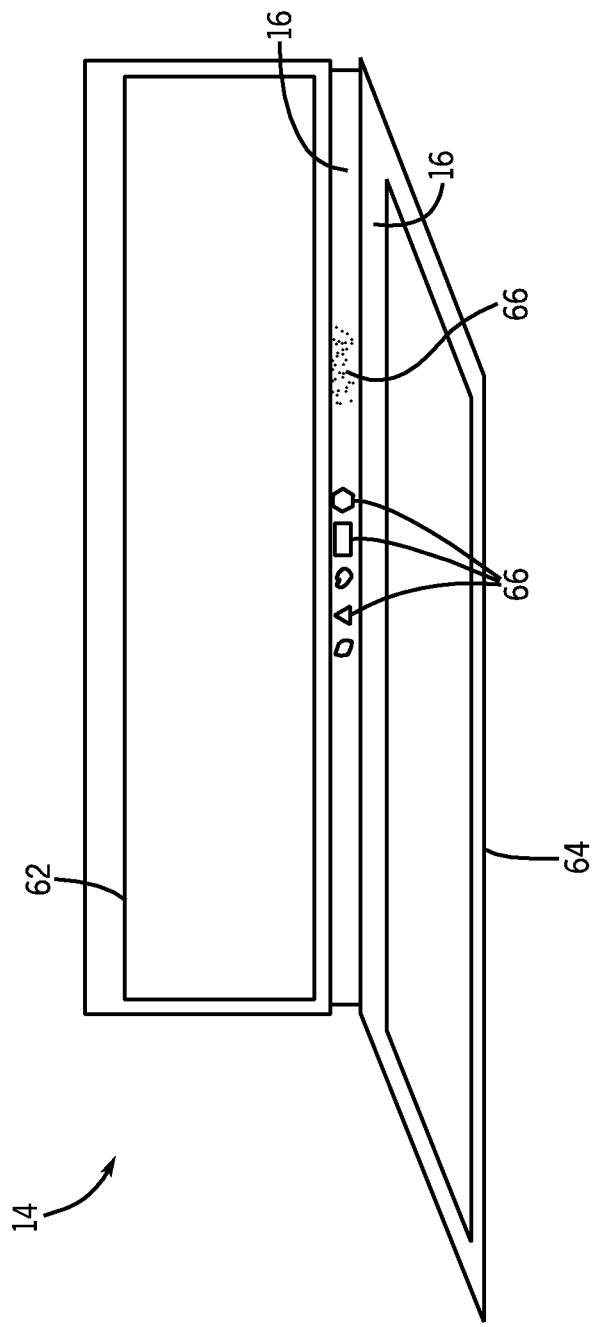
FIG. 4 is a perspective view of an embodiment of a training workpiece in accordance with aspects of the present disclosure.

FIG. 4 is a perspective view of an embodiment of the training workpiece 14 that may be used with the training system 10. The training workpiece 14 includes the substantially transparent weld joint 16, as illustrated. Furthermore, the training workpiece 14 includes a vertical portion 62 and a horizontal portion 64. Moreover, the weld joint 16 is positioned at the intersection of the vertical potion 62 and the horizontal portion 64. In the present embodiment, the weld joint 16 includes a pattern 66 (e.g., shapes, dots, curves, numbers, letters, etc.) configured to be detected by the optical sensor 18 of the training torch 12. For example, the substantially transparent weld joint 16 may include a pattern 66 such that the optical sensor 18 may determine what portion of the training workpiece 14 is being detected based on the detected image data of the pattern 66. The pattern 66 may be imbedded within the weld joint 16 and/or may provide external texture to the weld joint 16.

As may be appreciated, using the systems, devices, and techniques described herein, a low cost welding training system 10 may be provided for training welding operators. The welding training system 10 may allow a greater number of welding operators to be trained and may provide the welding operators with a greater amount of time to use the welding training system 10 (e.g., due to its low cost). Furthermore, as described above, welding operators may receive feedback (e.g., torch angle, travel speed, etc.) while operating the welding training system 10 to improve welding techniques.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding training system comprising:
   a display configured to show welding features related to a training welding operation;
   a training workpiece comprising a substantially transparent weld joint configured to be placed adjacent to the display during the training welding operation such that a portion of the display is visible by looking through the substantially transparent weld joint;
   a processing device coupled to the display and configured to provide welding data relating to the training welding operation to the display; and
   a training torch comprising an optical sensor, wherein the training torch is coupled to the processing device and configured to provide the processing device with data from the optical sensor corresponding to a position of the training torch relative to the training workpiece.

2. The system of claim 1, wherein the display is configured to show a virtual weld bead of the training welding operation behind the substantially transparent weld joint of the training workpiece.

3. The system of claim 1, wherein the display is configured to show a travel speed and/or a torch angle of the training welding operation.

4. The system of claim 1, comprising a stand configured to support the training workpiece.

5. The system of claim 1, wherein the substantially transparent weld joint comprises a pattern configured to be detected by the optical sensor.

6. The system of claim 1, wherein the optical sensor comprises a camera configured to receive image data corresponding to the training workpiece.

7. The system of claim 6, wherein the camera comprises an adjustable lens to change a focal point of the camera.

8. The system of claim 6, wherein the camera is configured to alter a camera focus based on a distance between the camera and the training workpiece.

9. The system of claim 1, wherein the optical sensor is configured to detect image data shown on the display.

10. The system of claim 1, wherein the training torch comprises an optical emitter, and wherein the optical sensor of the training torch is configured to detect emissions from the optical emitter after the emissions reflect off of the training workpiece.

11. A welding training system comprising:
    a training workpiece comprising a substantially transparent weld joint configured to be placed adjacent to a display during a training welding operation such that a portion of the display is visible by looking through the substantially transparent weld joint; and
    a training torch comprising a sensor configured to detect data corresponding to a position of the training torch relative to the training workpiece during the training welding operation.

12. The system of claim 11, wherein the sensor comprises a magnetic sensor configured to detect a magnetic field of the training workpiece.

13. The system of claim 11, wherein the sensor comprises a gyroscope configured to detect an orientation of the training torch.

14. The system of claim 13, wherein the display is configured to show the orientation of the training torch during the training welding operation.

15. The system of claim 11, wherein the display is configured to show a virtual weld bead formed during the training welding operation behind the substantially transparent weld joint of the training workpiece.

16. A welding training system comprising:
    a processing device coupled to a display and configured to provide welding data relating to a training welding operation to the display, wherein the display is configured to show a virtual workpiece; and
    a training torch comprising an optical sensor, wherein the training torch is coupled to the processing device and configured to provide the processing device with data from the optical sensor corresponding to a position of the training torch relative to a training workpiece, wherein the training workpiece comprises the virtual workpiece.

17. The system of claim 16, wherein the training torch comprises an optical emitter, and wherein the optical sensor of the training torch is configured to detect emissions from the optical emitter after the emissions reflect off of the training workpiece.

18. The system of claim 16, wherein the training torch is configured to detect a weld joint on the virtual workpiece present on the display.

* * * * *